(12) United States Patent
Yoshida et al.

(10) Patent No.: US 9,739,540 B2
(45) Date of Patent: Aug. 22, 2017

(54) HEAT CONDUCTION MEMBER

(71) Applicant: NGK INSULATORS, LTD., Nagoya (JP)

(72) Inventors: Shinya Yoshida, Nagoya (JP); Hironori Takahashi, Nagoya (JP); Tatsuo Kawaguchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 818 days.

(21) Appl. No.: 13/895,656

(22) Filed: May 16, 2013

(65) Prior Publication Data
US 2013/0248159 A1    Sep. 26, 2013

Related U.S. Application Data (63) Continuation of application No. PCT/JP2011/076430, filed on Nov. 16, 2011.

(30) Foreign Application Priority Data

Nov. 18, 2010  (JP) .................................. 2010-257835
Oct. 19, 2011  (JP) .................................. 2011-229909

(51) Int. Cl.
*F28D 7/10*    (2006.01)
*F01N 3/02*    (2006.01)
(Continued)

(52) U.S. Cl.
CPC ......... *F28D 7/106* (2013.01); *B01D 46/2429* (2013.01); *B01J 35/04* (2013.01);
(Continued)

(58) Field of Classification Search
CPC ........ F25D 3/107; F01N 3/055; F01N 3/2889; F01N 3/046; F01N 3/043; B01D 46/2429; F28D 21/0003
(Continued)

(56) References Cited

U.S. PATENT DOCUMENTS 3,568,723 A    3/1971  Sowards
4,029,836 A    6/1977  Wieczorek
(Continued)

FOREIGN PATENT DOCUMENTS

DE    2432285 A1 *  1/1976  .......... F01N 3/2046
EP    2 273 084 A1   1/2011
(Continued)

OTHER PUBLICATIONS

Translation of Japanese Patent Document JP 62009183 A entitled Translation-JP 62009183 A.*
(Continued)

*Primary Examiner* — Justin Jonaitis
*Assistant Examiner* — Paul Alvare
(74) *Attorney, Agent, or Firm* — Burr & Brown, PLLC (57) ABSTRACT

A heat conduction member includes: a cylindrical ceramic body, a metal pipe on the outer periphery side of the cylindrical ceramic body, and an intermediate member held between the cylindrical ceramic body and the metal pipe. The cylindrical ceramic body has passages passing through from one end face to the other end face and allowing the first fluid to flow therethrough. The intermediate member is made of material having at least a part having a Young's modulus of 150 Gpa or less. The first fluid is allowed to flow through the inside of the cylindrical ceramic body while the second fluid having lower temperature than that of the first fluid is allowed to flow on the outer peripheral face side of the metal pipe to perform heat exchange between the first fluid and the second fluid.

15 Claims, 9 Drawing Sheets

(51) Int. Cl.
| | |
|---|---|
| B01D 46/24 | (2006.01) |
| F01N 3/05 | (2006.01) |
| F01N 13/16 | (2010.01) |
| F28F 1/00 | (2006.01) |
| F28F 21/04 | (2006.01) |
| F28F 21/08 | (2006.01) |
| B01J 35/04 | (2006.01) |
| F28D 21/00 | (2006.01) |
| F28F 13/00 | (2006.01) |
| C04B 35/565 | (2006.01) |
| C04B 37/00 | (2006.01) |
| C04B 37/02 | (2006.01) |
| F01N 3/28 | (2006.01) |
| F01N 3/04 | (2006.01) |

(52) U.S. Cl.
CPC ......... *C04B 35/565* (2013.01); *C04B 37/008* (2013.01); *C04B 37/021* (2013.01); *F01N 3/055* (2013.01); *F01N 13/16* (2013.01); *F28D 21/0003* (2013.01); *F28F 1/003* (2013.01); *F28F 13/003* (2013.01); *F28F 21/04* (2013.01); *F28F 21/08* (2013.01); *B01D 46/2448* (2013.01); *C04B 2235/3826* (2013.01); *C04B 2235/428* (2013.01); *C04B 2235/5436* (2013.01); *C04B 2235/5472* (2013.01); *C04B 2235/606* (2013.01); *C04B 2235/9607* (2013.01); *C04B 2237/363* (2013.01); *C04B 2237/365* (2013.01); *C04B 2237/84* (2013.01); *F01N 3/043* (2013.01); *F01N 3/046* (2013.01); *F01N 3/2889* (2013.01); *F01N 2260/02* (2013.01); *F28F 2013/006* (2013.01); *F28F 2265/26* (2013.01); *F28F 2275/127* (2013.01); *Y02T 10/20* (2013.01)

(58) Field of Classification Search
USPC .................................. 165/157, 154; 60/320
See application file for complete search history.

(56) References Cited

U.S. PATENT DOCUMENTS

| | | | | |
|---|---|---|---|---|
| 4,852,645 | A * | 8/1989 | Coulon | F28F 13/00 122/367.1 |
| 5,039,577 | A * | 8/1991 | Knoell | B32B 7/02 165/905 |
| 5,048,168 | A * | 9/1991 | Vanaschen | B65G 23/04 432/246 |
| 5,899,063 | A * | 5/1999 | Leistritz | F01N 3/046 422/173 |
| 5,987,885 | A * | 11/1999 | Kizer | F01N 3/05 422/169 |
| 6,060,148 | A | 5/2000 | Matsubara et al. | |
| 6,284,021 | B1 * | 9/2001 | Lu | B01D 53/02 95/102 |
| 7,019,766 | B2 * | 3/2006 | Itabashi | G02B 26/125 347/243 |
| 7,248,456 | B2 * | 7/2007 | Nakamura | H01L 21/67109 279/128 |
| 7,427,309 | B2 * | 9/2008 | Ohno | B01D 39/2075 264/628 |
| 2001/0024626 | A1 | 9/2001 | TenEyck | |
| 2002/0088599 | A1 * | 7/2002 | Davis | B22D 19/14 164/97 |
| 2002/0096247 | A1 * | 7/2002 | Wydeven | B01D 46/525 156/210 |
| 2002/0146360 | A1 | 10/2002 | Bruck | |
| 2002/0192426 | A1 | 12/2002 | Ichikawa et al. | |
| 2004/0157717 | A1 * | 8/2004 | Oh | G03G 15/2053 492/56 |
| 2004/0188066 | A1 * | 9/2004 | Upadhya | F04B 17/00 165/80.4 |
| 2005/0096218 | A1 | 5/2005 | Kurth et al. | |
| 2005/0209088 | A1 | 9/2005 | Tani | |
| 2007/0084709 | A1 * | 4/2007 | Koyano | H01H 9/52 200/341 |
| 2007/0092692 | A1 | 4/2007 | Masukawa et al. | |
| 2008/0176029 | A1 | 7/2008 | Ichikawa | |
| 2008/0190081 | A1 | 8/2008 | Oshimi | |
| 2008/0247919 | A1 | 10/2008 | Kurth et al. | |
| 2009/0104091 | A1 | 4/2009 | Hoppenstedt et al. | |
| 2009/0308731 | A1 * | 12/2009 | Zabolotny | C10J 3/14 204/168 |
| 2011/0085953 | A1 | 4/2011 | Ogyu et al. | |

FOREIGN PATENT DOCUMENTS

| | | | |
|---|---|---|---|
| EP | 2 312 133 A1 | 4/2011 | |
| FR | 2930277 A1 * | 10/2009 | ............ F01N 3/0211 |
| JP | 62-9183 A1 | 1/1987 | |
| JP | 62009183 A * | 1/1987 | |
| JP | 01-119572 A1 | 5/1989 | |
| JP | 04-292477 A1 | 10/1992 | |
| JP | 07-100390 A1 | 4/1995 | |
| JP | 08-210128 A1 | 8/1996 | |
| JP | 09-164337 A1 | 6/1997 | |
| JP | 09-327627 A1 | 12/1997 | |
| JP | 10-264274 A1 | 10/1998 | |
| JP | 2003-513190 A1 | 4/2003 | |
| JP | 2004-036398 A1 | 2/2004 | |
| JP | 2004-059361 A1 | 2/2004 | |
| JP | 2005-125182 A | 5/2005 | |
| JP | 2005-522625 A1 | 7/2005 | |
| JP | 2007-117792 A1 | 5/2007 | |
| JP | 2008/004492 A1 | 1/2008 | |
| JP | 2009-255033 A1 | 11/2009 | |
| JP | 2010-170815 A1 | 8/2010 | |
| WO | 02/11884 A1 | 2/2002 | |
| WO | 2008/004492 A1 | 1/2008 | |
| WO | 2009/118986 A1 | 10/2009 | |

OTHER PUBLICATIONS

Document entitled "Thermal Conductivity of Silicon Carbide at High Temperatures" by F.F. Lezhenin and G. G. Gnesin, Feb. 1967.*
Translation of German Patent Document DE 2432285 A1 entitled Translation-DE2432285 A1.*
Translation of French Patent Document FR 2930277 A1 entitled Translation-FR 2930277 A1.*
U.S. Appl. No. 14/095,279, filed Dec. 3, 2013, Suzuki et al.
Extended European Search Report (Application No. 11842097.5) dated Nov. 4, 2014.
U.S. Appl. No. 13/491,709, filed Jun. 8, 2012, Suzuki et al.
U.S. Appl. No. 14/036,379, filed Sep. 25, 2013, Suzuki et al.
International Search Report and Written Opinion dated Dec. 27, 2011.
U.S. Appl. No. 13/852,144, filed Mar. 28, 2013, Miyazaki, et al.
U.S. Appl. No. 14/140,918, filed Dec. 26, 2013, Kawaguchi et al.
Japanese Office Action (Application No. 2012-544282) dated Dec. 15, 2015.
European Office Action, European Application No. 11 842 097.5, dated Feb. 18, 2016 (5 pages).
European Office Action, European Application No. 11842097.5, dated Feb. 27, 2017 (5 pages).

* cited by examiner

HEAT CONDUCTION MEMBER

BACKGROUND OF THE INVENTION

1. Field of the Invention

The present invention relates to a heat conduction member where a cylindrical ceramic body is covered with a metal pipe.

2. Description of Related Art

Heat can be used effectively by heat exchange from a high temperature fluid to a low temperature fluid. For example, there is a heat recovery technique of recovering heat from high temperature gas such as combustion exhaust gas of an engine or the like. As a gas/liquid heat exchanger, a fin-provided tube-shaped heat exchanger of an automobile radiator, an air-conditioning outdoor unit, or the like is general. However, for recovering heat from gas such as automobile exhaust gas, it is difficult to use a general metal heat exchanger at high temperature because it has poor heat resistance. Therefore, heat resistant metals and ceramic materials having heat resistance, thermal shock resistance, corrosion resistance, and the like are suitable. However, heat resistant metals have problems such as high costs, difficulty in processing, high weight because of high density, and low heat conduction.

Therefore, a heat recovery technique using a ceramic material has been developed. For example, there is a technique of performing heat exchange by the use of a cylindrical ceramic body. In this case, heat exchange is performed by allowing the first fluid to flow through the inside portion of the cylindrical ceramic body and the second fluid to flow through the outside portion. In the case of heat exchange using a cylindrical ceramic body between gas and liquid, it is necessary to shield the cylindrical ceramic body lest the cylindrical ceramic body should have liquid leakage to mix the two fluids together.

Patent Document 1 discloses a technique of recovering heat by integrating a ceramic honeycomb structure as a cylindrical ceramic body with a metal base material (metal pipe).

PRIOR ART DOCUMENT

Patent Document

Patent Document 1: JP-A-9-327627

SUMMARY OF THE INVENTION

However, in the case of integrating a ceramic honeycomb structure with a metal base material (metal pipe) as in the Patent Document 1, there arise a problem of thermal expansion caused in use to deteriorate adhesion between the honeycomb structure and the metal base material and a problem of thermal stress generation to cause breakage in the honeycomb structure.

In addition, in the case of integrating a cylindrical ceramic body with a metal pipe by press-fitting, the durability is reduced because of increase in thermal resistance by insufficient adhesion, breakage of heat conduction member by excessive precompression, and large residual stress remaining in the metal pipe.

In the case of integrating a cylindrical ceramic body with a metal pipe by brazing, it is difficult to secure wettability, and stress is caused by a thermal expansion difference.

The challenge of the present invention is to provide a heat conduction member inhibiting stress generation due to a thermal expansion difference while maintaining a thermal coupling state in the case of covering the cylindrical ceramic body with a metal pipe.

The inventors found out that the aforementioned problem can be solved by arranging an intermediate member made of a material having a Young's modulus of 150 GPa or less between the cylindrical ceramic body and the metal pipe on the outer peripheral side of the cylindrical ceramic body. That is, according to the present invention, there are provided the following heat conduction members.

According to a first aspect of the present invention, a heat conduction member comprising: a cylindrical ceramic body having passages passing through from one end face to the other end face and allowing a first fluid as a heating body to flow therethrough, a metal pipe on the outer periphery side of the cylindrical ceramic body is included, and an intermediate member held between the cylindrical ceramic body and the metal pipe and made of material having at least a part having a Young's modulus of 150 GPa or less; wherein the first fluid is allowed to flow through the inside of the cylindrical ceramic body while the second fluid having lower temperature than that of the first fluid is allowed to flow on the outer peripheral face side of the metal pipe to perform heat exchange between the first fluid and the second fluid.

According to a second aspect of the present invention, the heat conduction member according to the above first aspect is provided, wherein the intermediate member is brought into contact with at least a part of the metal pipe and the bcylindrical ceramic body.

According to a third aspect of the present invention, the heat conduction member according to the above first or second aspects is provided, wherein the intermediate member has atleast a part having a heat conductivity of 1 W/m·K or more.

According to a fourth aspect of the present invention, the heat conduction member according to any one of the above first to third aspects is provided, wherein the intermediate member is of the graphite sheet, has a Young's modulus of 1 GPa or less, and has a heat conductivity of 3 W/m·K or more in the thickness direction.

According to a fifth aspect of the present invention, the heat conduction member according to any one of the above first to fourth aspects is provided, wherein the cylindrical ceramic body has a heat conductivity of 100 W/m·K or more.

According to a sixth aspect of the present invention, the heat conduction member according to any one of the above first to fifth aspects is provided, wherein the cylindrical ceramic body is a honeycomb structure having partition walls of a porous body and a plurality of cells functioning as fluid passages separated and formed by the partition walls.

According to a seventh aspect of the present invention, the heat conduction member according to the above sixth aspect is provided, wherein the honeycomb structure contains silicon carbide as a main component.

Adhesion is improved by arranging an intermediate member made of a material having a Young's modulus of 150 GPa between the cylindrical ceramic body and the metal pipe on the outer periphery side of the cylindrical ceramic body. This improves heat conductance, and heat in the cylindrical ceramic body can efficiently be discharged outside the metal pipe. In addition, since the heat conductance is excellent in the axial (longitudinal) direction, heat on the tip (inlet) side can be released to the rear (outlet) side. In the case that a graphite sheet is used as the intermediate member, since side slipping is possible by the graphite sheet, stress due to the thermal expansion difference between the cylindrical ceramic body and the metal pipe is hardly caused. Though the joint portion of the metal pipe and cylindrical ceramic body is at risk of being exposed to a temperature up to about 150° C., graphite has a sufficient heat resistant temperature of 400° C. or more. In addition, it is in no danger of corrosion.

DETAILED DESCRIPTION OF THE INVENTION

Hereinbelow, embodiments of the present invention will be described with referring to drawings. The present invention is not limited to the following embodiments, and changes, modifications, and improvements may be added as long as they do not deviate from the scope of the invention.

Figure 1:
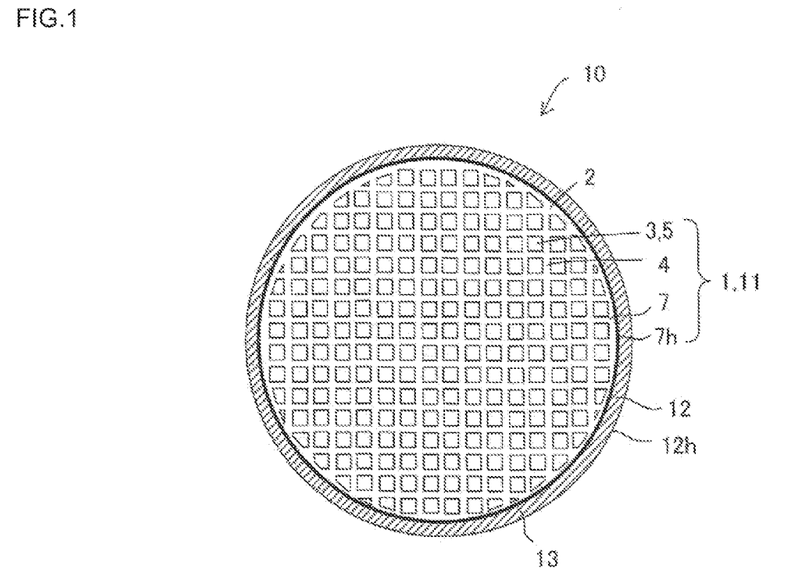
FIG. 1 is a schematic view from one end face in the axial direction, showing a heat conduction member of the present invention.
Figure 2:
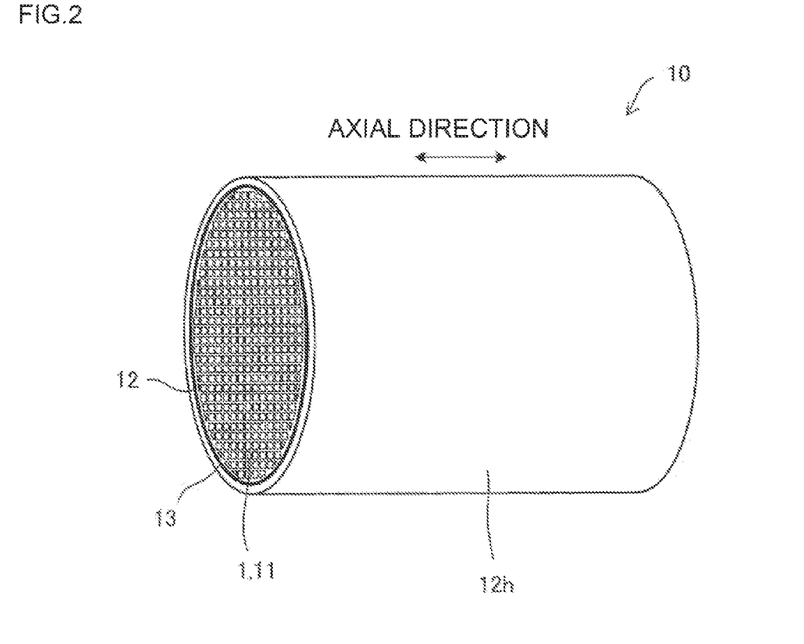
FIG. 2 is a perspective view showing a heat conduction member of the present invention.

FIG. 1 shows a view from one end face in the axial direction of a heat conduction member 10 of the present invention, and FIG. 2 shows a perspective view of the heat conduction member 10. The heat conduction member 10 is provided with a cylindrical ceramic body 11, a metal pipe 12 on the outer periphery side of the cylindrical ceramic body 11, and the intermediate member 13 held between the cylindrical ceramic body 11 and the metal pipe 12. The cylindrical ceramic body 11 has passages passing through from one end face 2 to the other end face 2 and allowing a first fluid as a heating body to flow therethrough. The intermediate member 13 is made of a material having at least a part having a Young's modulus of 150 GPa or less. By allowing the first fluid to flow through the inside of the cylindrical ceramic body 11 and the second fluid having lower temperature than that of the first fluid to flow on the outer peripheral face 12h side of the metal pipe 12, the heat conduction member 10 can perform heat exchange between the first fluid and the second fluid. Since the heat conduction member 10 is provided with the metal pipe 12 on the outer periphery side of the cylindrical ceramic body 11, the first fluid and the second fluid are completely separated from each other and do not mix together. In addition, since the heat conduction member 10 is provided with the metal pipe 12, processing depending on the installation site and the installation method is easy with high flexibility. The heat conduction member 10 is strong against shock from outside since the cylindrical ceramic body 11 can be protected by the metal pipe 12.

By the use of the intermediate member 13 of a material having a Young's modulus of 150 GPa for the heat conduction member 10, adhesion between the metal pipe 12 and the cylindrical ceramic body 11 can be improved, and heat conductance can be enhanced. In this case, it is preferable that the intermediate member 13 is brought into contact with at least a part of the metal pipe 12 and the cylindrical ceramic body 11 to obtain good heat conductance of the heat conduction member 10.

Further, it is preferable that the intermediate member 13 has at least a part having a heat conductivity of 1 W/m·K or more. When the heat conductivity of the intermediate member 13 is 1 W/m·K or more, the heat conductance of the heat conduction member 10 can be enhanced.

As the intermediate member 13, a graphite sheet, a metal sheet, a gel sheet, an elastoplastic fluid, and the like can be mentioned. As the metal constituting the metal sheet, Au, Ag, Cu, Al, and the like can be mentioned. The elastoplastic fluid is a material which behaves as a solid (having an elastic modulus) without plastic deformation when a small force is applied and which deforms as a fluid with freely changing the shape when a large force is applied. And grease and the like can be mentioned for example. In consideration of adhesion, heat conductance, and the like, a graphite sheet is preferably used as the intermediate member 13. Hereinbelow, description of an example will be given with a graphite sheet as the intermediate member 13.

The metal pipe 12 and the cylindrical ceramic body 11 can be engaged with each other by, for example, shrink fitting in the state of holding the intermediate member 13 of a graphite sheet therebetween (first method for integration described later). By integrating the metal pipe 12 with the cylindrical ceramic body 11, the first fluid and the second fluid are inhibited from mixing together. By the shrink fitting with the intermediate member 13 as the graphite sheet being held, pressure is applied to the graphite sheet in the environment at room temperature to 150° C. in use of the joint portion of the metal pipe 12 and cylindrical ceramic body 11 to be able to transfer heat.

The graphite sheet in the present specification means a graphite containing expanding graphite as the main component and being processed to have a sheet shape by rolling or a sheet-shaped one obtained by thermally decomposing a polymer film. The graphite sheet includes a graphite sheet and a carbon sheet. It is preferable that the graphite sheet has a Young's modulus of 1 GPa or less in the thickness direction and a heat conductivity of 1 W/m·K or more in the thickness direction. The heat conductivity in the thickness direction is more preferably 3 to 10 W/m·K. The heat conductivity in the in-plane direction is preferably 5 to 1600 W/m·K, more preferably 100 to 400 W/m·K.

The Young's modulus of the graphite sheet is preferably 1 MPa to 1 GPa. It is more preferably 5 MPa to 500 MPa, furthermore preferably 10 MPa to 200 MPa. When the Young's modulus is 1 MPa or more, the graphite has sufficient density and good heat conductance. On the other hand, when it is 500 MPa or less, even a thin graphite sheet sufficiently causes elastic deformation upon shrink fitting, and adhesion and a stress relaxation effect of the metal pipe 12 can be obtained.

The thickness of the graphite sheet is preferably 25 μm to 1 mm, more preferably 25 μm to 500 μm, furthermore preferably 50 μm to 250 μm. The thinner the graphite sheet is, the more expensive it is. When it is thick, heat resistance is generated. By using the graphite sheet within this range, the heat conductance becomes good, and the heat in the cylindrical ceramic body 11 can efficiently be discharged outside the metal pipe 12.

The heat conductivity of the cylindrical ceramic body 11 is preferably 100 W/m·K or more. It is more preferably 120 to 300 W/m·K, furthermore preferably 150 to 300 W/m·K. This range can improve heat conductance, and the heat in the cylindrical ceramic body 11 can efficiently be discharged outside the metal pipe 12.

Figure 3:
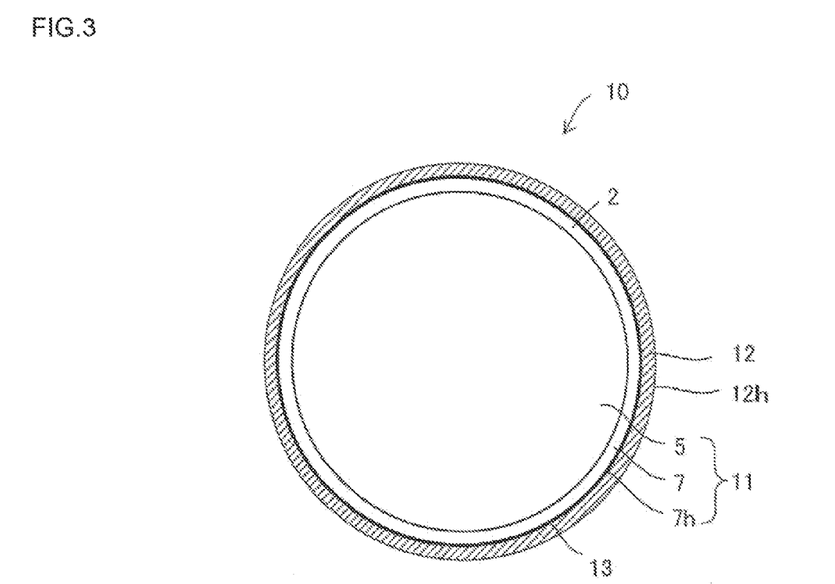
FIG. 3 is a schematic view from one end face in the axial direction, showing another embodiment of a heat conduction member of the present invention.

The cylindrical ceramic body 11 is formed of ceramic into a cylindrical shape and has fluid passages passing through from one end face 2 to the other end face 2 in the axial direction. The cylindrical shape is not limited to a circular cylindrical shape (circular columnar shape) and may be a shape where a cross section perpendicular to the axial (longitudinal) direction has an elliptic shape, or an oval shape where circular arcs are compounded, or a prism shape where a cross section has a polygonal shape such as a quadrangular shape. It is preferable that the cylindrical ceramic body 11 is a honeycomb structure 1 having partition walls 4 of a porous body and a plurality of cells functioning as fluid passages separated and formed by the partition walls 4. By having the partition walls 4, the heat from the fluid passing through the inside portion of the cylindrical ceramic body 11 can efficiently be collected and transferred outside. FIGS. 1 and 2 show an embodiment using a honeycomb structure 1 having a large number of cells formed therein as the cylindrical ceramic body 11. FIG. 3 shows an embodiment using a hollow ceramic pipe having only the outer peripheral wall 7 with no partition wall 4 as the cylindrical ceramic body 11.

For the cylindrical ceramic body 11, it is preferable to use a ceramic having excellent heat resistance. In particular, if heat conductance is considered, the main component is preferably SiC (silicon carbide) having high heat conductance. The main component means that 50 mass % or more of the cylindrical ceramic body 11 is silicon carbide.

However, it is not necessary that the entire cylindrical ceramic body 11 is constituted of SiC (silicon carbide) as long as SiC (silicon carbide) is contained in the main body. That is, the cylindrical ceramic body 11 is preferably formed of ceramic containing SiC (silicon carbide).

Incidentally, since a porous body even made of SiC (silicon carbide) cannot obtain high heat conductivity, it is preferable to impregnate the cylindrical ceramic body 11 with silicon in the manufacturing process to obtain a dense structure. The dense structure enables to obtain high heat conductivity. For example, in the case of SiC (silicon carbide) porous body, the heat conductivity is about 20 W/m·K. However, by the densification, it can be about 150 W/m·K.

As the cylindrical ceramic body 11, Si-impregnated SiC, (Si+Al)-impregnated SiC, metal composite SiC, $Si_3N_4$, SiC, or the like can be employed, but to form a dense structure to obtain high heat conductivity, Si-impregnated SiC or (Si+Al)-impregnated SiC can be employed. Since Si-impregnated SiC has a structure where a SiC particle surface is surrounded by a coagulation of a metal silicon melt and where SiC particles are unitarily joined by means of metal silicon, the silicon carbide is shielded from the atmosphere containing oxygen and thereby inhibited from being oxidized. Further, though SiC has characteristics of high heat conductivity and easy heat release, Si-impregnated SiC is densely formed and has sufficient strength as a heat transfer member while showing high heat conductivity and heat resistance. That is, the cylindrical ceramic body 11 formed of a Si—SiC based (Si-impregnated SiC, (Si+Al)-impregnated SiC) material shows high heat conductivity in addition to excellent properties of heat resistance, heat shock resistance, oxidation resistance, and corrosion resistance against acid and alkali.

In the case of forming the cylindrical ceramic body 11 as a honeycomb structure 1 having a plurality of cells 3 functioning as passages separated and formed by the partition walls 4, a desired cell shape may appropriately be selected from a circle, an ellipse, a triangle, a quadrangle, a hexagon, other polygons, and the like.

There is no particular limitation on the cell density (i.e., the number of cells per unit cross-sectional area) of the honeycomb structure 1, and it can appropriately be designed according to the purpose. However, it is preferably within the range from 25 to 2000 cells/in$^2$ (4 to 320 cells/cm$^2$). When the cell density is above 25 cells/in$^2$, the strength of the partition walls 4 and, eventually, the strength of the honeycomb structure 1 itself and an effective GSA (geometric surface area) can be made sufficient. On the other hand, when the cell density is 2000 cells/in² or less, pressure loss at the time that a heat medium flows is reduced.

The cell number per honeycomb structure 1 is preferably 1 to 10,000, particularly preferably 200 to 2,000. When the cell number is too large, since the honeycomb structure itself becomes large, the heat conduction distance from the first fluid side to the second fluid side becomes long to make the heat flux small due to the increase of heat conduction loss. When the cell number is small, the heat conduction area on the first fluid side becomes small, and heat resistance on the first fluid side cannot be reduced, thereby reducing the heat flux.

There is no particular limitation on the thickness of the partition walls 4 (wall thickness) of the cells 3 of the honeycomb structure 1, and it may appropriately be designed according to the purpose. The wall thickness is preferably 50 μm to 2 mm, more preferably 60 μm to 500 μm. The wall thickness of 50 μm or more improves mechanical strength and inhibits breakage due to shock or heat stress. On the other hand, the wall thickness of 2 mm or less reduces pressure loss of the fluid due to the increase in the proportion of cell capacity on the honeycomb structure side, which enables to raise the heat exchange rate.

The density of the partition walls 4 of the cells 3 of the honeycomb structure 1 is preferably 0.5 to 5 g/cm³. In the case of 0.5 g/cm³ or more, strength of the partition walls 4 becomes sufficient, and it can inhibit the partition walls 4 from breaking due to pressure at the time that the first fluid passes through the passages. When the density is 5 g/cm³ or less, the honeycomb structure 1 itself does not become heavy, and the weight can be reduced. By the density within the aforementioned range, the honeycomb structure 1 can be made strong. In addition, an effect of improving the heat conductivity can be obtained.

In the case that the first fluid (high temperature side) passed through the heat exchanger 30 (see FIG. 14) is exhaust gas, it is preferable that a catalyst is loaded on the wall faces inside the cells 3 of the honeycomb structure 1 where the first fluid (high temperature side) passes. This is because it becomes possible to change reaction heat (exothermic reaction) generated upon exhaust gas purification in addition to the role of exhaust gas purification. It is preferable that the catalyst contains at least one element selected from the group consisting of noble metals (platinum, rhodium, palladium, ruthenium, indium, silver, and gold), aluminum, nickel, zirconium, titanium, cerium, cobalt, manganese, zinc, copper, zinc, iron, niobium, magnesium, lanthanum, samarium, bismuth, and barium. These may be metals, oxides, or other compounds.

The amount of the catalyst (catalyst metal+carrier) loaded on the partition walls 4 of the cells 3 of the first fluid flowing portion 5, where the first fluid (high temperature side) passes, of the honeycomb structure 1 is preferably 10 to 400 g/L, more preferably 0.1 to 5 g/L in the case of a noble metal. When the amount of the catalyst (catalyst metal+carrier) is 10 g/L or more, the catalyst function is sufficiently exhibited. On the other hand, when it is 400 g/L or less, the pressure loss does not become too large, and increase of the production costs can be suppressed.

As the metal pipe 42, one having heat resistance and corrosion resistance is preferable, and, for example, a SUS pipe, a copper pipe, or a brass pipe can be used. The temperature of the coolant water as the second fluid flowing on the outer peripheral face 12*h* of the metal pipe 12 can rise up to about 120° C., and it is preferable to specify the diameter of the metal pipe 12 to the range of the formula described below lest the pressure between the cylindrical ceramic body 11 and the metal pipe 12 should escape due to the difference of the thermal expansion coefficient. That is, when the outer diameter of the cylindrical ceramic body 11 at 25° C. of room temperature is d, the thickness of graphite sheet is c, the thermal expansion coefficient of the cylindrical ceramic body 11 is α, the thermal expansion coefficient of the metal pipe 12 is β, and the temperature of the shrink fitting is 1000° C., it is preferable to set the inner diameter D of the metal pipe 12 so that $$d+2\times c-975\times \beta \times d < D < d+2\times c-125\times (\beta-\alpha)\times d$$

can be satisfied.

The aforementioned inner diameter D of the metal pipe 12 is within the range where the pressure of tight fitting is securely applied in the temperature range from ordinary temperature to 150° C., which is conceivable in the joint portion between the cylindrical ceramic body 11 and the metal pipe 12. The inner diameter D of the metal pipe 12 in this range enables to have no tensile stress remaining more than necessary in the metal pipe 12. Specifically, for example, when the outer diameter of the cylindrical ceramic body 11 is 42 mm, the thermal expansion coefficient α of the cylindrical ceramic body 11 is $4.0 \times 10^{-6}$, the thermal expansion coefficient β of the metal pipe 12 is $17 \times 10^{-6}$, and the thickness c of the graphite sheet is 0.2 mm, D is larger than 41.704 mm and smaller than 42.332 mm.

(Method for Manufacturing Heat Conduction Member)

Next, a method for manufacturing a heat conduction member 10 of the present invention will be described. In the first place, SiC powders having different average particle diameters are mixed together to prepare a mixture of SiC powders. A binder and water are mixed with the mixture of SiC powders, and they are kneaded with a kneader to obtain a kneaded material. The kneaded material is put in a vacuum kneader to prepare a kneaded material having a circular columnar shape.

Next, the kneaded material is extruded to form a honeycomb formed body. In the extrusion, by selecting a die and a jig having appropriate shapes, the shape and the thickness of the outer peripheral wall, partition wall thickness, cell shape, cell density, and the like can be made desirable. It is preferable to use a die made of superhard alloy which hardly abrades away. The honeycomb formed body is formed so as to have a structure where the outer peripheral wall has a cylindrical shape or a quadrangular prism shape and where the portion inside the outer peripheral wall is partitioned by partition walls to have a square lattice shape. These partition walls are formed to be parallel to each other at regular intervals in each of the directions perpendicular to each other and to pass straight across the portion inside the outer peripheral wall. This enables to obtain a square cross-sectional shape of the cells in the portion inside the outer peripheral wall except for the outermost peripheral portion.

Next, the honeycomb formed body obtained by extrusion is dried. In the first place, the honeycomb formed body is dried in an electromagnetic wave heating method and then dried in the external heating method. By such two-step drying, moisture corresponding to 97% of the amount of the entire moisture contained in the honeycomb formed body before drying is removed from the honeycomb formed body.

Next, the honeycomb formed body is degreased in a nitrogen atmosphere. Further, a lump of metal Si is put on the honeycomb structure obtained by the degreasing and fired in vacuum or an inert gas of reduced pressure. During the firing, the lump of the metal Si put on the honeycomb structure is melted to impregnate the outer peripheral wall 7 and the partition walls 4 with metal Si. For example, when the heat conductivity of the outer peripheral wall 7 and the partition walls 4 is 100 W/m·K, the lump of metal Si having 70 parts by mass with respect to 100 parts by mass of the honeycomb structure is used. When the heat conductivity of the outer peripheral wall 7 and the partition walls 4 is made 150 W/m·K, the lump of metal Si having 80 parts by mass with respect to 100 parts by mass of the honeycomb structure is used.

Next, a method of integrating the honeycomb structure 1 manufactured as described above, the intermediate member 13, and the metal pipe 12 will be described. In the first method, first, a graphite sheet used as the intermediate member 13 is wrapped around the outer peripheral face 7*h* of the outer peripheral wall 7 of the honeycomb structure 1. At this time, it may be bonded by the use of an adhesive. By using the adhesive, the graphite sheet can be bonded uniformly. It is desirable that the adhesive is sufficiently thin and has good heat conductance. In addition, since a tough fitting state is obtained after shrink fitting, the adhesion may be entire face adhesion or partial adhesion. Then, the temperature of the metal pipe 12 is raised up to about 1000° C. with a high frequency heater. Then, the honeycomb structure is inserted into the metal pipe 12, and they are integrated by shrink fitting to form a heat conduction member 10.

Figure 4:
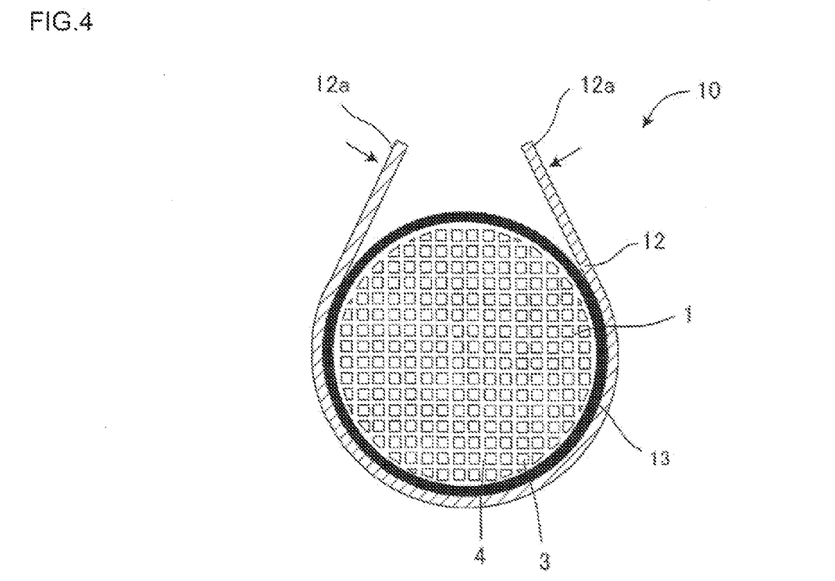
FIG. 4 is a schematic view for explaining the second method for integration.

The second method for integrating the honeycomb structure 1, the intermediate member 13, and the metal pipe 12 will be described. In the second method, a metal plate (flat plate) is used to obtain a metal pipe 12. In the first place, a graphite sheet is wrapped around the outer peripheral face 7*h* of the outer peripheral wall 7 of the honeycomb structure 1. Next, the metal plate (flat plate) is wrapped around the honeycomb structure 1 with applying pressure and tightened (see FIG. 4). Then, the end portions 12*a* of the metal plate having a cylindrical shape by being wrapped around the honeycomb structure 1 are joined to each other to obtain a metal pipe 12. As the joining of the end portions 12*a* of the metal plate, for example, laser welding can be employed.

The third method of integrating the honeycomb structure 1, the intermediate member 13, and the metal pipe 12 will be described. The third method is a hot plastic processing method. In the first place, a graphite sheet is wrapped around the outer peripheral face 7*h* of the outer peripheral wall 7 of the honeycomb structure 1. Next, a honeycomb structure 1 is installed inside the metal pipe 12. The inner diameter of the metal pipe 12 is sufficiently large in comparison with the outer peripheral diameter of the honeycomb structure 1. Next, the temperature of the region where the honeycomb structure 1 is installed of the metal pipe 12 is raised to about 400 to 1100° C. By pulling both the end portions of the metal pipe while locally heating the metal pipe 12, the diameter of the metal pipe 12 shrinks. By cooling after the metal pipe 12 and the honeycomb structure 1 are integrated, a heat conduction member 10 can be formed.

In a heat conduction member 10 of the present invention, by arranging the intermediate member 13 of a graphite sheet or the like having a low Young's modulus between the cylindrical ceramic body 11 and the metal pipe 12 on the outer peripheral side, adhesion is enhanced. This enables the heat conductivity in the thickness direction (diametral direction of the pipe) to be 3 W/m·K or more, and the heat conductance is good. In addition, the heat conductivity in the longitudinal (axial) direction can be made 250 W/m·K or more, and heat conductivity is good. Since side slipping is possible by the graphite sheet and the like, stress due to thermal expansion difference between the cylindrical ceramic body 11 and the metal pipe 12 is hardly caused. Therefore, heat resistance is practically sufficient.

Figure 5:
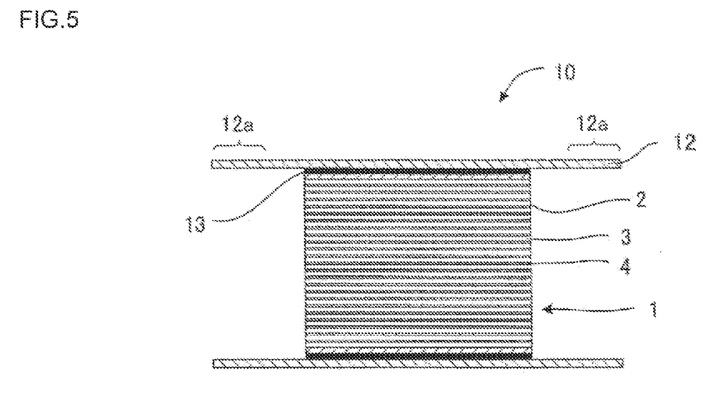
FIG. 5 is a cross-sectional view cut along a face parallel to the axial direction, showing another embodiment of a heat conduction member of the present invention.

FIG. 5 is a cross-sectional view cut along a face parallel to the axial direction, showing another embodiment of a heat conduction member 10 of the present invention. As shown in FIG. 5, the metal pipe 12 is longer than the length in the axial direction of the honeycomb structure 1. By such constitution, the end portions 12*a* of the metal pipe 12 can easily be processed according to the installation site and the use of the heat conduction member 10.

Figure 6A:
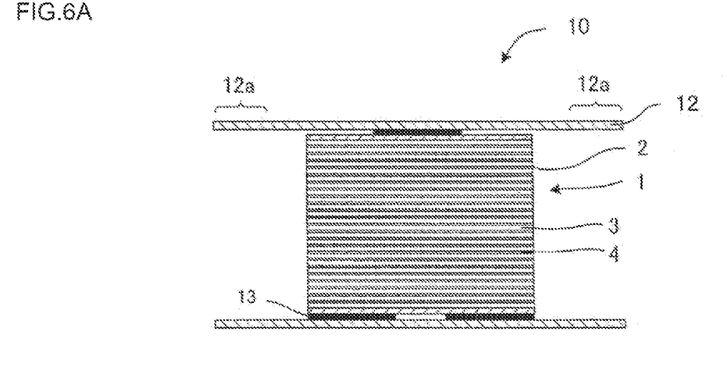
FIG. 6A is a cross-sectional view cut along a face parallel to the axial direction, showing an embodiment where the intermediate member is held only in a part.
Figure 6B:
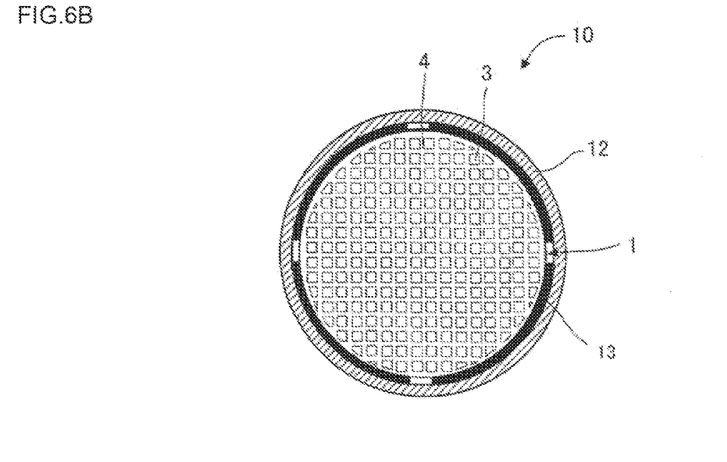
FIG. 6B is a cross-sectional view cut along a face perpendicular to the axial direction, showing another embodiment where the intermediate member is held only in a part.

FIG. 6A is a cross-sectional view cut along a face parallel to the axial direction, showing an embodiment where the intermediate member 13 is held only in a part. FIG. 6B is a cross-sectional view cut along a face perpendicular to the axial direction, showing another embodiment where the intermediate member 13 is held only in a part. The intermediate member 13 does not have to be arranged entirely over the honeycomb structure 1 as shown in FIGS. 6A and 6B. Even in such an embodiment, effects of relaxing thermal stress and improving heat conductance efficiency can be obtained. The intermediate member 13 may be mesh-shaped.

Figure 7A:
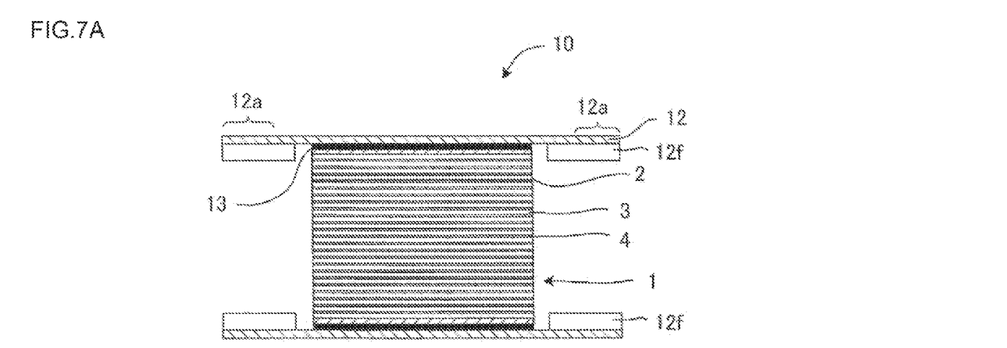
FIG. 7A is a cross-sectional view cut along a face parallel to the axial direction, showing an embodiment where fins are arranged inside the metal pipe.
Figure 7B:
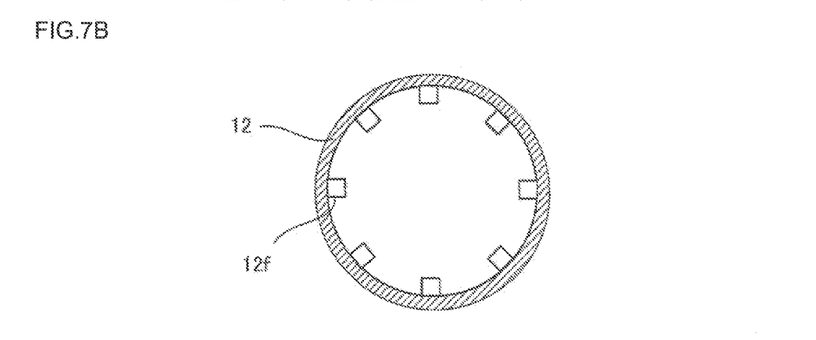
FIG. 7B is a cross-sectional view cut along a face perpendicular to the axial direction, showing an embodiment where fins are arranged inside the metal pipe.

FIG. 7A shows an embodiment where fins 12*f* are arranged inside the metal pipe 12. FIG. 7B is a cross-sectional view cut along a face perpendicular to the axial direction of the embodiment of FIG. 7A. Fins 12*f* are arranged in the end portion 12*a* inside the metal pipe 12. By thus arranging the fins 12*f* in the metal pipe 12, the rigidity of the metal pipe can be improved.

Figure 8A:
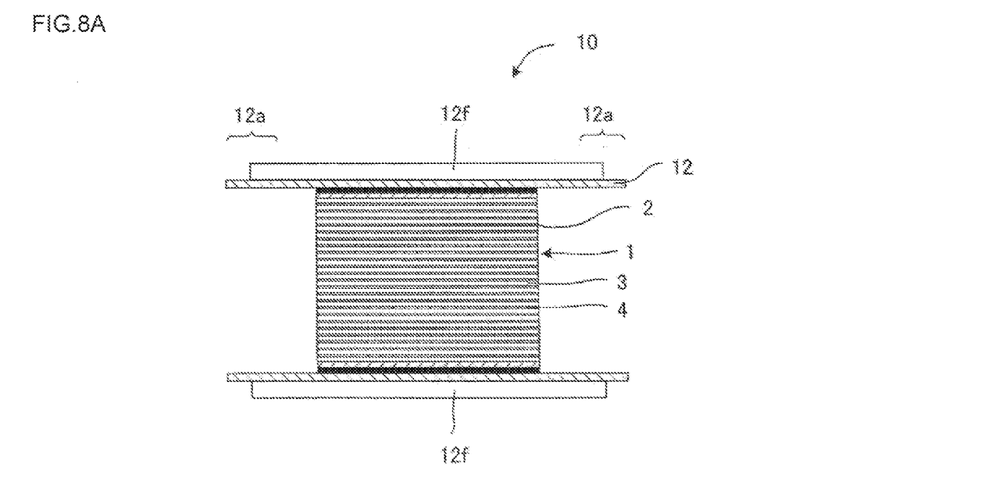
FIG. 8A is a cross-sectional view cut along a face parallel to the axial direction, showing an embodiment where fins are arranged outside the metal pipe.
Figure 8B:
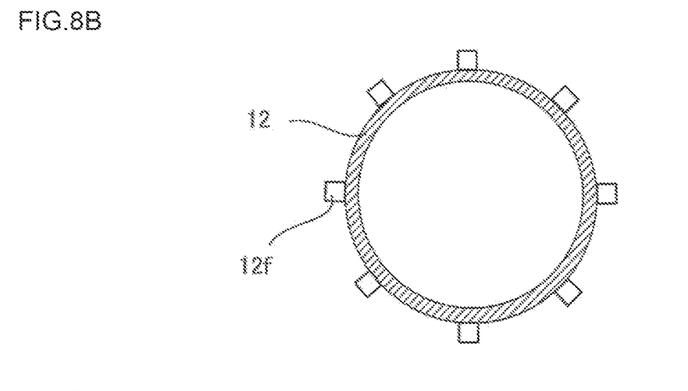
FIG. 8B is a cross-sectional view cut along a face perpendicular to the axial direction, showing an embodiment where fins are arranged outside the metal pipe.

FIG. 8A shows an embodiment where fins 12*f* are arranged outside the metal pipe 12. FIG. 8B is a cross-sectional view cut along a face perpendicular to the axial direction of the embodiment shown in FIG. 8A. The fins 12*f* are arranged over almost the entire length in the axial direction outside the metal pipe 12. By thus arranging the fins 12*f* in the metal pipe 12, the rigidity of the metal pipe can be improved.

Figure 9A:
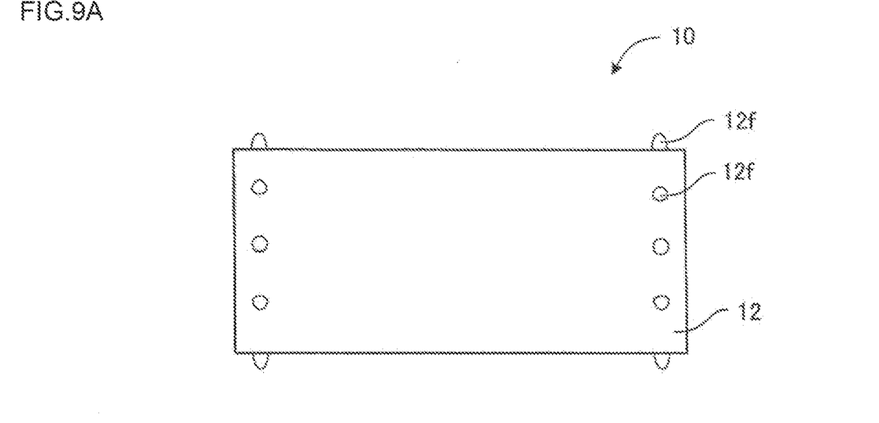
FIG. 9A is a schematic view showing another embodiment where fins are arranged outside the metal pipe.
Figure 9B:
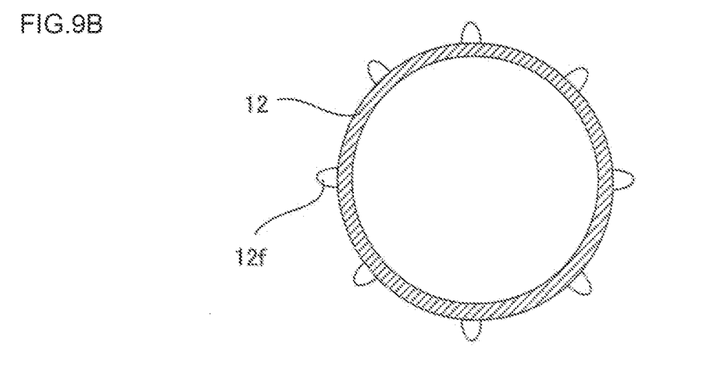
FIG. 9B is a cross-sectional view cut along a face perpendicular to the axial direction, showing another embodiment where fins are arranged outside the metal pipe.

FIG. 9A is a schematic view showing another embodiment where fins 12*f* are arranged outside the metal pipe 12. FIG. 9B is a cross-sectional view cut along a face perpendicular to the axial direction of the embodiment shown in FIG. 9A. The shape of the fins 12*f* is not limited to those of the embodiments of FIGS. 8B and 9B.

Figure 10A:
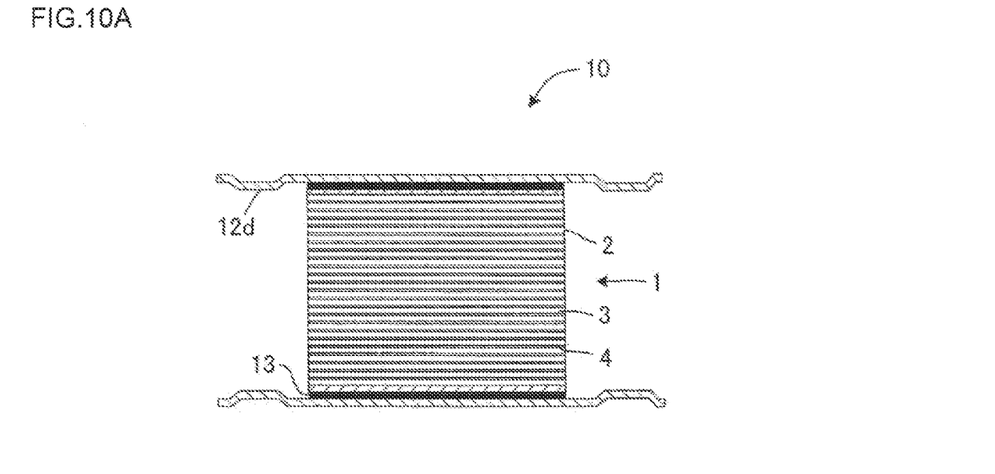
FIG. 10A is a cross-sectional view cut along a face parallel to the axial direction, showing an embodiment where a step portion is formed in the metal pipe.
Figure 10B:
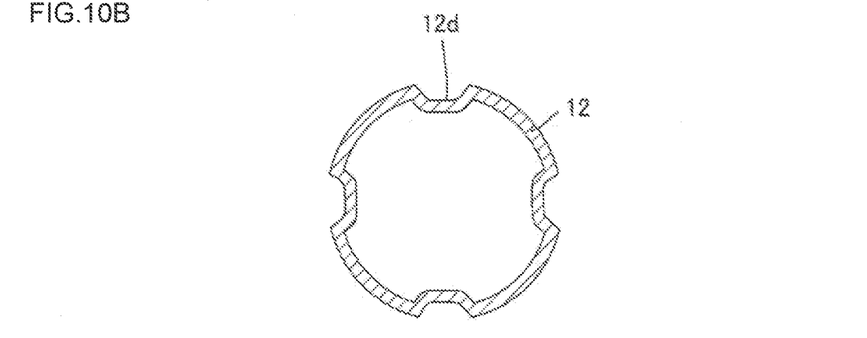
FIG. 10B is a cross-sectional view cut along a face perpendicular to the axial direction, showing an embodiment where a step portion is formed in the metal pipe.
Figure 11:
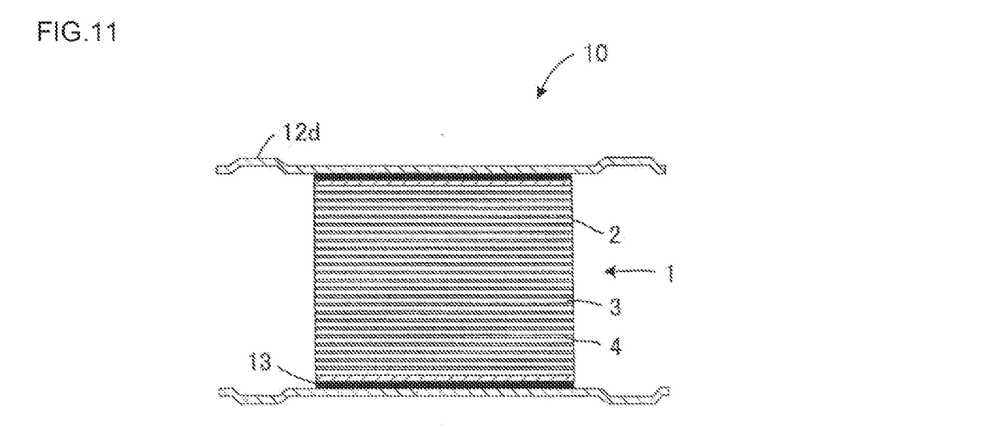
FIG. 11 is a cross-sectional view cut along a face parallel to the axial direction, showing another embodiment where a step portion is formed in the metal pipe.

FIG. 10A is a cross-sectional view cut along a face parallel to the axial direction, showing an embodiment where a step portion 12*d* is formed in the metal pipe 12. FIG. 10B is a cross-sectional view cut along a face perpendicular to the axial direction, showing the embodiment of FIG. 10A. In this embodiment, the step portion 12*d* is formed to have a depressed shape toward inside. The portion having such a shape can be formed by a pressing method. By arranging the depressed portion, the rigidity of the metal pipe 12 can be improved. As shown in FIG. 11, a portion protruding toward outside may be formed in the metal pipe 12 as the step portion 12*d*.

Figure 12A:
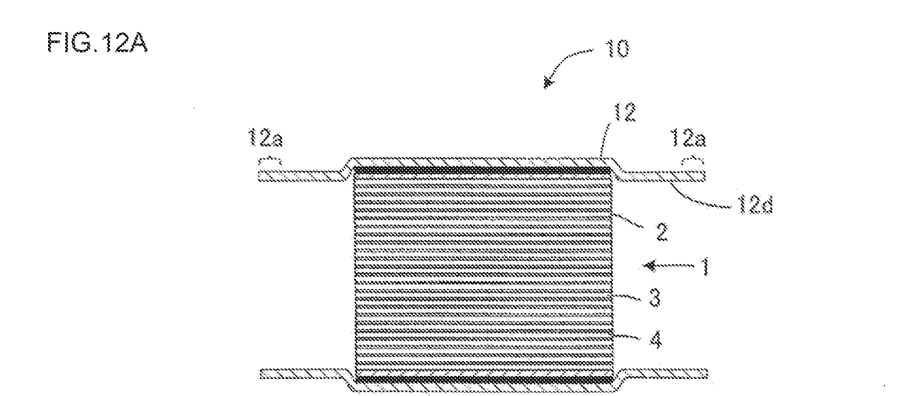
FIG. 12A is a cross-sectional view cut along a face parallel to the axial direction, showing an embodiment where a step portion is formed from the vicinity of an end portion of the honeycomb structure to the end portion of the metal pipe.

FIG. 12A shows an embodiment where a step portion 12*d* is formed in a cylindrical fashion from the vicinity of an end portion 2 of the honeycomb structure 1 to the end portion 12*a* of the metal pipe 12. The step portion 12*d* of the present embodiment has a shrunk diameter from the vicinity of the end portion 2 of the honeycomb structure 1 to the end portion 12*a* of the metal pipe 12, and the step portion 12*d* is formed in a cylindrical shape (in a circular cylindrical shape). By forming such a step portion 12*d*, stress of the metal pipe 12 can be relaxed.

Figure 12B:
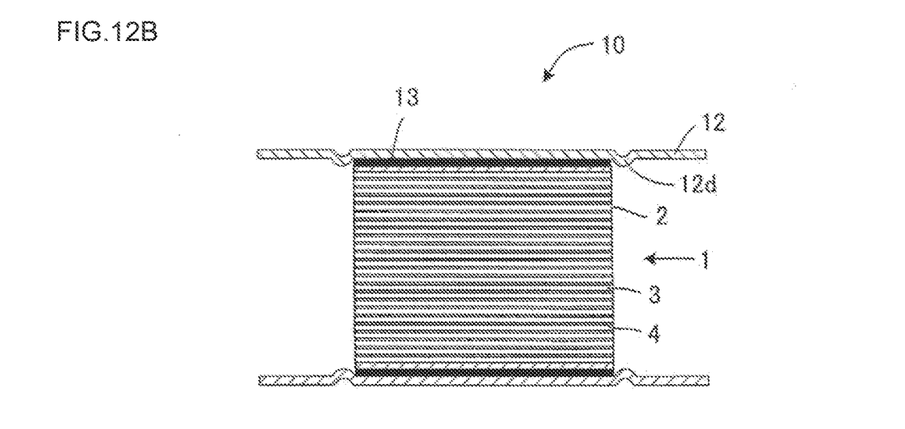
FIG. 12B is a cross-sectional view cut along a face parallel to the axial direction, showing an embodiment where a step portion is formed in the metal pipe in the vicinity of an end portion of the honeycomb structure.

FIG. 12B shows an embodiment where a step portion 12d is formed in the metal pipe 12 in the vicinity of an end portion 2 of the honeycomb structure 1. By forming such a step portion 12d, stress of the metal pipe 12 can be relaxed.

Figure 12C:
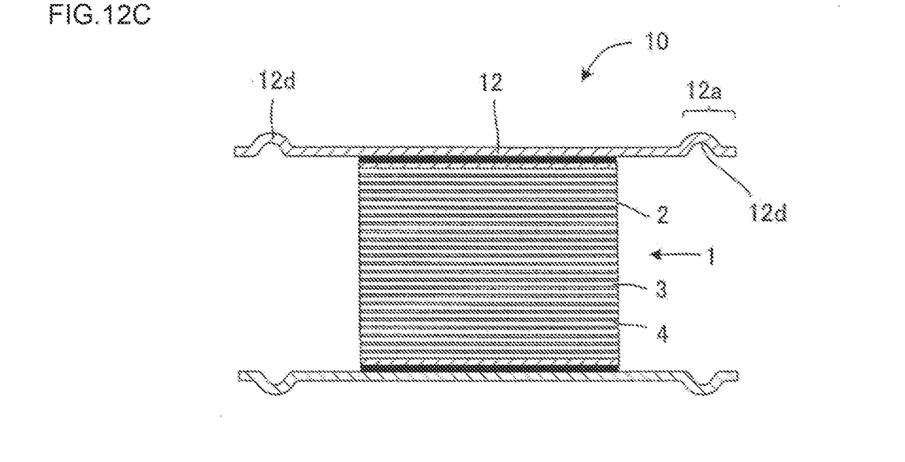
FIG. 12C is a cross-sectional view cut along a face parallel to the axial direction, showing an embodiment where a step portion is formed in the end portion of the metal pipe.

FIG. 12C shows an embodiment where, a step portion 12d is formed in the end portion 12a of the metal pipe 12. By forming such a step portion 12d, stress of the metal pipe 12 can be relaxed.

Figure 13A:
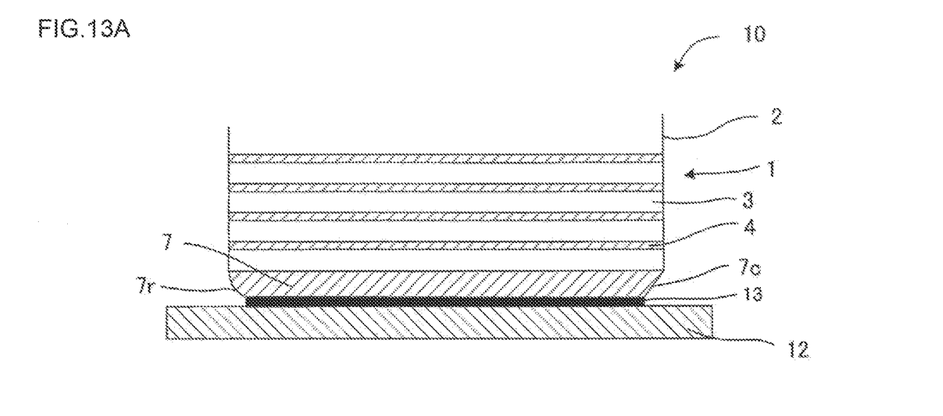
FIG. 13A is a cross-sectional view showing an embodiment where the edge in the axial direction of the honeycomb structure was chamfered.

FIG. 13A shows an embodiment where the edge of the outer peripheral wall 7 in the axial direction of the honeycomb structure 1 was chamfered. As the shape of the edge, a C shape (C-shape portion 7c) or an R shape (R-shape portion 7r) can be mentioned. By thus forming the edge to have a chamfered shape, chipping of the edge of the honeycomb structure 1 can be inhibited.

Figure 13B:
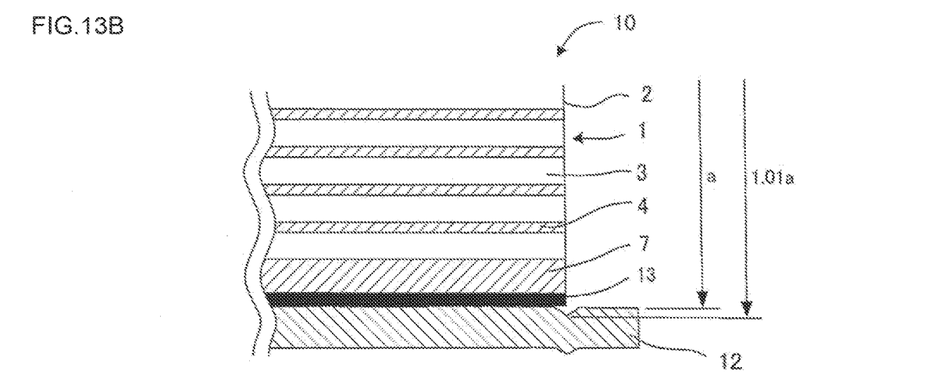
FIG. 13B is a cross-sectional view showing an embodiment having a structure where the inner diameter of the metal pipe at a portion covering the edge of the honeycomb structure is at least 1.01 times the inner diameter of the other portion.

In addition, as shown in FIG. 13B, it is preferable to constitute so that the inner diameter of the metal pipe 12 at a portion covering the edge of the outer peripheral wall 7 of the honeycomb structure 1 is at least 1.01 times the inner diameter of the other portion. Such constitution enables to inhibit chipping of the edge of the outer peripheral wall 7 of the honeycomb structure 1.

Figure 14:
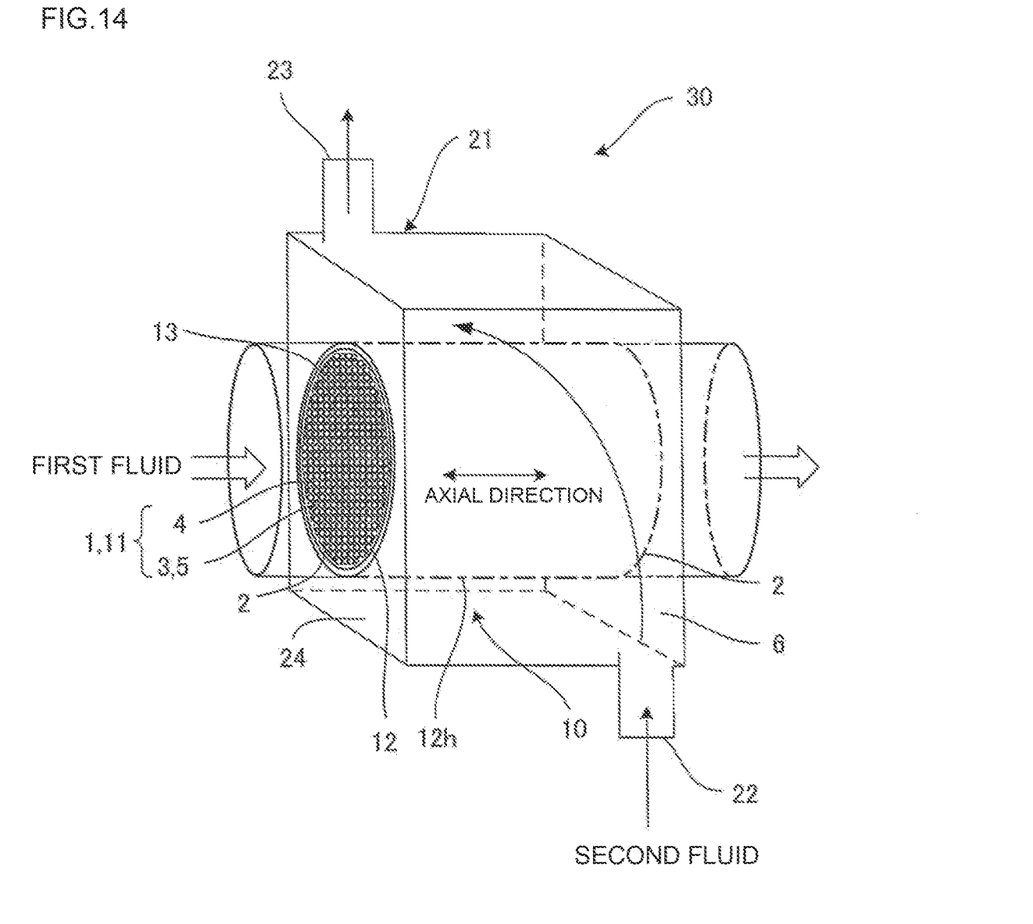
FIG. 14 is a schematic view showing a heat exchanger including a heat conduction member of the present invention.

FIG. 14 shows a perspective view of a heat exchanger 30 including a heat conduction member 10 of the present invention. As shown in FIG. 14, the heat exchanger 30 is formed of the heat conduction member 10 (honeycomb structure 1+intermediate member 13+metal pipe 12) and a casing 21 containing the heat conduction member 10 therein. The cells 3 of the honeycomb structure 1 of the cylindrical ceramic body 11 serve as the first fluid-flowing portion 5 where the first fluid flows therethrough. The heat exchanger 30 is constituted so that the first fluid having higher temperature than the second fluid flows through the cells 3 of the honeycomb structure 1. In addition, the inlet 22 and the outlet 23 for the second fluid are formed in the casing 21, and the second fluid flows on the outer peripheral face 12h of the metal pipe 12 of the heat conduction member 10.

That is, the second fluid-flowing portion 6 is formed by the inside face 24 of the casing 21 and the outer peripheral phase 12h of the metal pipe 12. The second fluid-flowing portion 6 is a portion for the second fluid; is formed by the casing 21 and the outer peripheral face 12h of the metal pipe 12; is separated from the first fluid-flowing portion 5 by the partition walls 4 of the honeycomb structure 1, intermediate member 13, and the metal pipe 12 to be able to transfer heat; receives heat of the first fluid flowing through the first fluid-flowing portion 5 by means of the partition walls 4, the intermediate member 13, and the metal pipe 12; and transfers heat to the body to be heated, which is the second fluid. The first fluid and the second fluid are completely separated from each other lest these fluids should be mixed together.

The first fluid-flowing portion 5 is constituted to have a honeycomb structure, and, in the case of a honeycomb structure, the fluid cannot flow into another cell 3 due to the partition walls 4 when the fluid passes through the cells 3, and the fluid linearly proceeds from the inlet to the outlet of the honeycomb structure 1. In addition, the honeycomb structure 1 of the heat exchanger 30 of the present invention is not plugged, and the heat transfer area of the fluid is increased, and thereby the size of the heat exchanger 30 can be reduced. This enables to increase the heat transfer amount per unit volume of the heat exchanger 30. Further, since it is not necessary to perform processing such as formation of plugging portions and formation of slits in the honeycomb structure 1, the heat exchanger 30 enables to reduce the production costs.

It is preferable that the heat exchanger 30 allows the first fluid having higher temperature than the second fluid to flow and allows heat conduction from the first fluid to the second fluid. When gas is allowed to flow as the first fluid while liquid is allowed to flow as the second fluid, the heat exchange between the first fluid and the second fluid can efficiently be conducted. That is, the heat exchanger 30 of the present invention can be applied as a gas/liquid heat exchanger.

There is no particular limitation on the heating body, which is the first fluid allowed to flow through the heat exchanger 30 of the present invention having the constitution as described above as long as it is a medium having heat, such as gas and liquid. The examples include automobile exhaust gas as the gas. In addition, there is no particular limitation on the body to be heated, which is the second fluid receiving heat from the heating body (exchanging heat), as a medium as long as the temperature is lower than that of the heating body.

EXAMPLE

Hereinbelow, the present invention will be described in more detail on the basis of Examples. However, it is not limited to these Examples.

Example 1

Preparation of Kneaded Material

In the first place, 70 mass % of SiC powder having an average particle diameter of 45 μm, 10 mass % of SiC powder having an average particle diameter of 35 μm, and 20 mass % of SiC powder having an average particle diameter of 5 μm were mixed together to prepare a mixture of SiC powders. To 100 parts by mass of the mixture of SiC powders were mixed 4 parts by mass of a binder and water, and they were kneaded with a kneader to obtain a kneaded material. The kneaded material was put in a vacuum kneader to manufacture a circular columnar kneaded material.

(Extrusion)

Next, the kneaded material was extruded to form a honeycomb formed body. In the extrusion, by selecting a die and a jig each having an appropriate form, the shape and thickness of the outer peripheral wall, the thickness of the partition wall, the cell shape, and the cell density were made desirable. A die made of superhard alloy which hardly abrades away was used. Regarding the honeycomb formed body, the outer peripheral wall was made to have a cylindrical shape or a hollow quadrangular prism shape, and the portion inside the outer peripheral wall was formed to have a structure partitioned in a square lattice pattern by partition walls. These partition walls were formed so that they are parallel to each other at regular interval in the directions perpendicular to each other and that they pass across the portion inside the outer peripheral wall. This made square the cross-sectional shape of the cells except for the cells in the outermost peripheral portion inside the outer peripheral wall.

Drying

Next, drying of a honeycomb formed body obtained by the extrusion was performed. The honeycomb formed body was dried by an electromagnetic wave heating method in the first place and then dried by an external heating method. By such two step drying, the moisture corresponding to 97% of the entire moisture amount contained in the honeycomb formed body before drying was removed from the honeycomb formed body.

(Degreasing, Impregnation with Metal Si, and Firing)

Next, degreasing of the honeycomb formed body was performed at 500° C. for five hours in a nitrogen atmosphere. A lump of metal Si was put on the honeycomb structure obtained by the degreasing, and firing was performed at 1450° C. for four hours in vacuum or in an inert gas of reduced pressure. During the firing, the metal Si lump put on the honeycomb structure was melted, and the outer peripheral wall and the partition walls were impregnated with the metal Si. In the case of allowing the outer peripheral wall and the partition walls to have a heat conductivity of 150 W/m·K, 80 parts by mass of the lump of metal Si was used with respect to 100 parts by mass of the honeycomb structure.

As described above, there was manufactured a honeycomb structure 1 made of silicon carbide and having a circular columnar (cylindrical) shape and, as the main body size, a diameter (outer diameter) of 40 mm and a length of 80 mm. That is, as the cylindrical ceramic body 11, the honeycomb structure 1 was used. The honeycomb structure 1 has a cell density of 23.3 cells/cm$^2$, a thickness of the partition walls 4 (partition wall thickness) of 0.3 mm, and the honeycomb structure 1 has a heat conductivity of 150 kW/m·K.

Next, a graphite sheet with an acrylic adhesive material (HT-705A produced by OTSUKA ELCTRIC CO., LTD.) was bonded to the outer peripheral face 7h of the honeycomb structure 1. The graphite sheet had a heat conductivity of 6 W/m·K in the thickness direction and a Young's modulus of 0.1 GPa. Though the graphite sheet with an acrylic adhesive material was used at that time, it may be bonded by separately using a heat conductive adhesive.

Next, the temperature of the metal pipe 12 was raised to 1000° C. by a high frequency heater, and the honeycomb structure 1 was inserted into the metal pipe 12 and subjected to shrink fitting. As the metal pipe 12, a metal pipe having a following diameter was used lest the pressure should be released. That is, there was used a metal pipe having an inner diameter D satisfying $$d+2\times c-975\times\beta\times d < D < d+2\times c-125\times(\beta-\alpha)\times d$$

when the outer diameter of the cylindrical ceramic body 11 (honeycomb structure 1) at 25° C. of room temperature was d, the thickness of graphite sheet was c, the thermal expansion coefficient of the cylindrical ceramic body 11 was α, and the thermal expansion coefficient of the metal pipe 12 was β.

Specifically, the outer diameter of the cylindrical ceramic body 11 was 42 mm, the thermal expansion coefficient α of the cylindrical ceramic body 11 was $4\times10^{-6}$/° C., the thermal expansion coefficient β of the metal pipe 12 was $17\times10^{-6}$/° C., the thickness c of the graphite sheet was 0.2 mm, and 41.704 mm<D<42.332 mm. In the present Example, a SUS304 thin pipe was used as the metal pipe 12.

Reference Example

As a target for comparison (standard sample), there were prepared a cylindrical ceramic body 11 (honeycomb structure 1) single body which was not covered with a metal pipe 12. The cylindrical ceramic body 11 was the same as the Example 1.

Comparative Example 1

In the same manner as in Example 1, there was manufactured a heat conductive member composed of a cylindrical ceramic body 11 (honeycomb structure 1) and a metal pipe 12 with no intermediate member 13 of a graphite sheet.

(Heat Transfer Efficiency Test)

With regard to the samples of Example 1, Reference Example, and Comparative Example 1, there was measured a heat transfer efficiency to the second fluid at the time that the first fluid heated at 300° C. was passed through the cells 3 of the honeycomb structure 1 of the heat conduction member 10. Specifically, it was performed as follows. Nitrogen gas was allowed to flow through the first fluid-flowing portion 5 of the honeycomb structure 1, and (cooling) water was allowed to flow through the second fluid-flowing portion 6 in the casing 21. Both the inlet temperature and flow rate of the first fluid and the second fluid into the honeycomb structure 1 were under the same conditions. Nitrogen gas ($N_2$) at 300° C. as the first fluid was allowed to flow at a flow rate of 7.6 L/sec. with respect to the honeycomb structure 1. The (cooling) water of the second fluid was allowed to flow at a flow rate of 10 L/min. with respect to the honeycomb structure 1. Example 1 used a sample having the second fluid passage on the outer periphery side of the heat conduction member 10 serving as the first fluid passage (see FIG. 14).

(Test Result)

Table 1 shows heat transfer efficiency. The heat transfer efficiency (%) was obtained by calculating each energy amount from ΔT° C. (outlet temperature−inlet temperature of the honeycomb structure 1) of the first fluid (nitrogen gas) and the second fluid (water) and calculating with the formula 1.

Heat transfer efficiency (%)=(inlet temperature of the first fluid (gas)−outlet temperature of the first fluid (gas))/(inlet temperature of the first fluid (gas)−inlet temperature of the second fluid (cooling water))     (Formula 1)

TABLE 1

| | | First fluid | | Second fluid | | |
|---|---|---|---|---|---|---|
| | Structure | Inlet temperature | Outlet temperature | Inlet temperature | Outlet temperature | Heat transfer efficiency |
| Example 1 | Cylindrical ceramic body + graphite sheet (thickness of 0.2 mm) + metal pipe | 300.9° C. | 150.0° C. | 39.8° C. | 41.8° C. | 58.2% |
| Ref. Ex. | Single body of cylindrical ceramic body | 300.3° C. | 142.9° C. | 39.3° C. | 41.3° C. | 60.8% |
| Comp. Ex. 1 | Cylindrical ceramic body + metal pipe | 300.5° C. | 155.3° C. | 39.5° C. | 40.5° C. | 55.8% |

In comparison with the single body of the cylindrical ceramic body 11 (Reference Example), the heat conduction member with no graphite sheet (Comparative Example 1) has a lower heat transfer efficiency by 5.0%. However, by using the graphite sheet therein (Example 1), the decrease was suppressed to 2.6%. This enabled to confirm the improvement in thermal adhesiveness by the graphite sheet. That is, in the case of covering the cylindrical ceramic body 11 with a metal pipe, by using a graphite sheet therebetween, the thermally bonded state can be improved.

Examples 1 to 9, Reference Example, Comparative Examples 1 and 2

Furthermore, each of the other intermediate members 13 was subjected to the same heat transfer test to obtain the heat transfer efficiency. In addition, after the heat transfer efficiency test, presence/absence of crack generation in the cylindrical ceramic body 11 was checked. It is shown in Table 2. Example 1, Reference Example, and Comparative Example 1 of Table 2 were the same as in Table 1. The structure was "cylindrical ceramic body 11+intermediate member 13+metal pipe 12" except for Reference Example and Comparative Example 1. The structure of Reference Example was a single body of a cylindrical ceramic body 11, and the structure of Comparative Example 1 was cylindrical ceramic body 11+metal pipe 12 with no intermediate member 13.

TABLE 2

| | Intermediate member | | | Evaluation result | |
|---|---|---|---|---|---|
| | Material | Young's modulus GPa | Thickness mm | Heat transfer efficiency % | Presence/ Absence of crack generation |
| Example 1 | Graphite sheet | 0.1 | 0.2 | 58.2 | Absent |
| Example 2 | Graphite sheet | 0.1 | 0.025 | 59.0 | Absent |
| Example 3 | Graphite sheet | 0.1 | 0.25 | 57.8 | Absent |
| Example 4 | Graphite sheet | 0.1 | 0.5 | 57.6 | Absent |
| Example 5 | Cu | 117 | 0.2 | 55.9 | Absent |
| Example 6 | Ag | 76 | 0.2 | 56.1 | Absent |
| Example 7 | Al | 69 | 0.2 | 56.5 | Absent |
| Example 8 | Heat conduction gel sheet | 0.01 | 0.2 | 57.0 | Absent |
| Example 9 | Heat conduction grease | <0.01 | — | 57.5 | Absent |
| Ref. Ex. | No intermediate member, no metal pipe | — | — | 60.8 | Absent |
| Comp. Ex. 1 | No intermediate member | — | — | 55.8 | Present |
| Comp. Ex. 2 | SUS304 | 197 | 0.2 | 54.5 | Present |

In each of Examples 1 to 9, the heat transfer efficiency was better than that of Comparative Example 1, which had no intermediate member 13. In addition, no crack was generated in the cylindrical ceramic body 11. Comparative Example 2 employed SUS304 as the intermediate member 13. The Young's modulus was 197 GPa, and the heat transfer efficiency was not good.

INDUSTRIAL APPLICABILITY

There is no particular limitation on the application of a heat exchanger of the present invention in the automobile field or the industrial field as long as heat is exchanged between the heating body (high temperature side) and the body to be heated (low temperature side). In particular, it is suitable when at least one of the heating body and the body to be heated is liquid. In the case of using it for the purpose of collecting exhaust heat from the exhaust gas in the automobile field, it can be used in order to improve fuel efficiency of automobiles.

DESCRIPTION OF REFERENCE NUMERALS

1: honeycomb structure, 2: end face (in the axial direction), 3: cell, 4: partition wall, 5: first fluid-flowing portion, 6: second fluid-flowing portion, 7: outer peripheral wall, 7c: C-shaped portion, 7h: outer peripheral face (of a cylindrical ceramic body), 7r: R-shaped portion, 10: heat conduction member, 11: cylindrical ceramic body, 12: metal pipe, 12a: end portion, 12d: step portion, 12f: fin, 12h: outer peripheral face (of metal pipe), 13: intermediate member (graphite sheet), 21: casing, 22: inlet (of the second fluid), 23: outlet (of the second fluid), 24: inside face (of the casing), 30: heat exchanger

The invention claimed is:

1. A heat conduction member comprising:
a cylindrical ceramic body having passages passing through from one end face to the other end face and allowing a first fluid as a heating body to flow therethrough,
a metal pipe on the outer periphery side of the cylindrical ceramic body, and
an intermediate member held between the cylindrical ceramic body and the metal pipe and made of material having at least a part having a Young's modulus of 150 GPa or less and at least part having a heat conductivity of 1W/m·K of more;
wherein the first fluid is allowed to flow through the inside of the cylindrical ceramic body while a second fluid having lower temperature than that of the first fluid is allowed to flow on the outer peripheral face side of the metal pipe to perform heat exchange between the first fluid and the second fluid, and
wherein the inner diameter of the metal pipe satisfies the relation:

$$d+2\times c-975\times \beta \times d < D < d+2\times c-125\times (\beta-\alpha)\times d,$$

and
wherein c is a thickness if the intermediate member, d is the outer diameter of the cylindrical ceramic body at 25° C., D is the inner diameter of the metal pipe, $\alpha$ is a thermal expansion coefficient of the cylindrical ceramic body and $\beta$ is a thermal expansion coefficient of the metal pipe.

2. The heat conduction member according to claim 1, wherein the intermediate member is brought into contact with at least a part of the metal pipe and the cylindrical ceramic body.

3. The heat conduction member according to claim 1, wherein the intermediate member is a graphite sheet, has a Young's modulus of 1 GPa or less in the thickness direction, and has a heat conductivity of 3 W/m·K or more in the thickness direction.

4. The heat conduction member according to claim 1, wherein the cylindrical ceramic body has a heat conductivity of 100 W/m·K or more.

5. The heat conduction member according to claim 1, wherein the cylindrical ceramic body is a honeycomb structure having partition walls and a plurality of cells functioning as fluid passages separated and formed by the partition walls.

6. The heat conduction member according to claim 5, wherein the cylindrical ceramic body is formed of at least one kind selected from the group consisting Si-impregnated SiC, (Si+Al)-impregnated SiC, metal composite SiC, $Si_3N_4$, and SiC.

7. The heat conduction member according to claim 5, wherein the cylindrical ceramic body comprises a SiC based material.

8. The heat conduction member according to claim 1, wherein the cylindrical ceramic body is a honeycomb structure having partition walls of a porous body and a plurality of cells functioning as fluid passages separated and formed by the partition walls.

9. The heat conduction member according to claim 8, wherein the honeycomb structure contains silicon carbide as a main component.

10. The heat conduction member according to claim 2, wherein the intermediate member is a graphite sheet, has a Young's modulus of 1 GPa or less in the thickness direction, and has a heat conductivity of 3 W/m·K or more in the thickness direction.

11. The heat conduction member according to claim 10, wherein the cylindrical ceramic body has a heat conductivity of 100 W/·K or more.

12. The heat conduction member according to claim 11, wherein the cylindrical ceramic body is a honeycomb structure having partition walls of a porous body and a plurality of cells functioning as fluid passages separated and formed by the partition walls.

13. The heat conduction member according to claim 12, wherein the honeycomb structure contains silicon carbide as a main component.

14. The heat conduction member according to claim 1, wherein a thickness of the intermediate member is 25 μm to 1 mm.

15. The heat conduction member according to claim 5, wherein a density of the partition walls is 0.5 to 5 $g/cm^3$.

* * * * *